United States Patent [19]
Becker

[11] 3,977,271
[45] Aug. 31, 1976

[54] STEERING WHEEL
[75] Inventor: Burkhardt Becker, Wolfsburg, Germany
[73] Assignee: Volkswagenwerk Aktiengesellschaft, Wolfsburg, Germany
[22] Filed: Nov. 26, 1974
[21] Appl. No.: 527,343

[30] Foreign Application Priority Data
Nov. 30, 1973 Germany............................ 2359698

[52] U.S. Cl................................. 74/552; 74/558.5
[51] Int. Cl.²........................................... B62D 1/04
[58] Field of Search..................... 74/552, 558, 558.5

[56] References Cited
UNITED STATES PATENTS

| | | | |
|---|---|---|---|
| 2,872,539 | 2/1959 | Berner | 74/552 X |
| 3,189,367 | 6/1965 | Glass | 74/558.5 X |
| 3,364,785 | 1/1968 | Geller | 74/552 |
| 3,548,676 | 12/1970 | Breitschwerdt | 74/552 |
| 3,567,246 | 3/1971 | Wilfert et al. | 74/552 X |
| 3,570,326 | 3/1971 | Albrecht et al. | 74/552 |
| 3,800,620 | 4/1974 | Barényl | 74/552 |

FOREIGN PATENTS OR APPLICATIONS

| | | |
|---|---|---|
| 1,550,192 | 12/1968 | France.................................. 74/552 |
| 2,005,421 | 9/1971 | Germany |

*Primary Examiner*—Benjamin W. Wyche
*Assistant Examiner*—F. D. Shoemaker
*Attorney, Agent, or Firm*—Brumbaugh, Graves, Donohue & Raymond

[57] ABSTRACT

The steering apparatus for a vehicle includes a steering column and a steering wheel having an annular rim, a central hub, and a plurality of spokes joining the rim to the hub. The steering wheel includes a metal member having (a) a rim portion defining a core for the rim of the steering wheel, (b) spoke portions defining the spokes of the steering wheel, and (c) a mounting portion within the hub of the steering wheel which can be coupled to an end of the steering column to mount the steering wheel on the column. The mounting portion of the metal member has a U or V shaped configuration with one leg of the U continuing into the spoke portions of the member and the other leg being secured to the end of the steering column. The mounting portion is also deformable such that its spaced-apart leg sections move toward each other to absorb impact energy when a load exceeding a predetermined load is exerted on the mounting portion through the steering wheel.

5 Claims, 3 Drawing Figures

3,977,271

STEERING WHEEL

BACKGROUND OF THE INVENTION

A conventional automobile steering wheel includes an annular rim, a central hub, and a plurality of spokes joining the rim to the hub. In the manufacture of steering wheels, it has already been proposed, in German Offenlegungsschrift No. 2,005,421, to incorporate a metal member formed to provide a core for the rim of the steering wheel, the spokes for the steering wheel, and a fixture for mounting the steering wheel on the end of a steering column. The metal member is deep drawn to produce an overall dished shape and the dished central area of the member is filled with a body of deformable, shock absorbing material. The surface of the shock absorbing body presented to the driver is located closer to the driver than the rim of the steering wheel. Thus, if the driver is thrown against the steering wheel in a collision, his body will contact the shock absorbing material and have its impact cushioned, before striking the rim of the steering wheel.

SUMMARY OF THE INVENTION

The present invention is directed to a steering wheel which utilizes a metal core member, but which can be manufactured more economically than conventional steering wheels, including the wheel described above, and which is constructed to absorb at least part of the energy transferred by the driver of a vehicle who impacts on the steering wheel in a collision. The steering apparatus for an automobile, for example, typically includes a steering column and a steering wheel having an annular rim, a central hub and a plurality of spokes joining the rim to the hub. A metal member that is incorporated into the steering wheel, in accordance with the invention, includes (a) a rim portion defining a core for the rim of the steering wheel, (b) at least one spoke portion that defines at least a core for a spoke, and (c) a mounting portion in the center of the metal member which can be coupled to the end of the steering column to mount the steering wheel on the steering column.

The mounting portion of the metal core member has two spaced apart leg sections and a section connecting an end of one leg section to a corresponding end of the other leg section so that the mounting portion has a U or V shaped configuration in cross-section. One leg section of the mounting portion continues into the spoke portion of the metal member, while the other leg section is attached to the end of the steering column. The mounting portion is deformable so that at least one of the spaced apart leg sections moves toward the other leg section to absorb impact energy when a load exceeding a predetermined maximum load is exerted on the mounting portion through the steering wheel.

As can be seen from the foregoing description, the U or V shaped cross-section of the mounting portion of the metal core member incorporated in the inventive steering wheel facilitates an energy-absorbing collapse or compressing of the steering wheel in a direction corresponding to the longitudinal axis of the associated steering column. Thus, in the event of a collision in which the driver of a vehicle is thrown against the steering wheel, the resulting energy absorbing deformation of the steering wheel will protect the driver against serious injury. Since the mounting portion of the metal core member provides an energy absorbing function, the steering wheel need not have the often seen dish-like configuration nor a padded hub that has a large end area and that projects beyond the rim of the wheel toward the driver. Similarly, the rim and spoke portions of the core need not have rounded profiles or cross-sections.

The amount of energy absorbing deformation possible is determined by the distance between the two legs of the mounting portion of the metal member measured in the direction of the longitudinal axis of the steering column. Deformation of the mounting portion upon the application of an impact load will continue until the impact energy is dissipated, until the two legs contact each other, or until the leg that is spaced from the end of the steering column is deformed so as to contact the steering column.

In a preferred and especially economical embodiment of the inventive steering wheel, the metal core member is stamped in one piece from sheet metal and bent into the desired configuration. The mounting portion of the metal core member is preferably housed in a tubular body fabricated of a deformable material, such as foamed plastic. The tubular body, which is part of the hub of the steering wheel, extends away from a plane defined by the rim of the steering wheel and toward the steering column mounting the steering wheel. At its end that is farther from the rim of the steering wheel, the tubular body is recessed to receive the end of the steering column and thereby cover the end of the column and the elements connecting the steering column to the steering wheel. The end of the tubular body adjacent the steering wheel rim is closed by a cap.

BRIEF DESCRIPTION OF THE DRAWINGS

For a better understanding of the invention, reference may be made to the following description of two exemplary embodiments, taken in conjunction with the figures of the accompanying drawings, in which.

DESCRIPTION OF EMBODIMENTS

Figure 1:
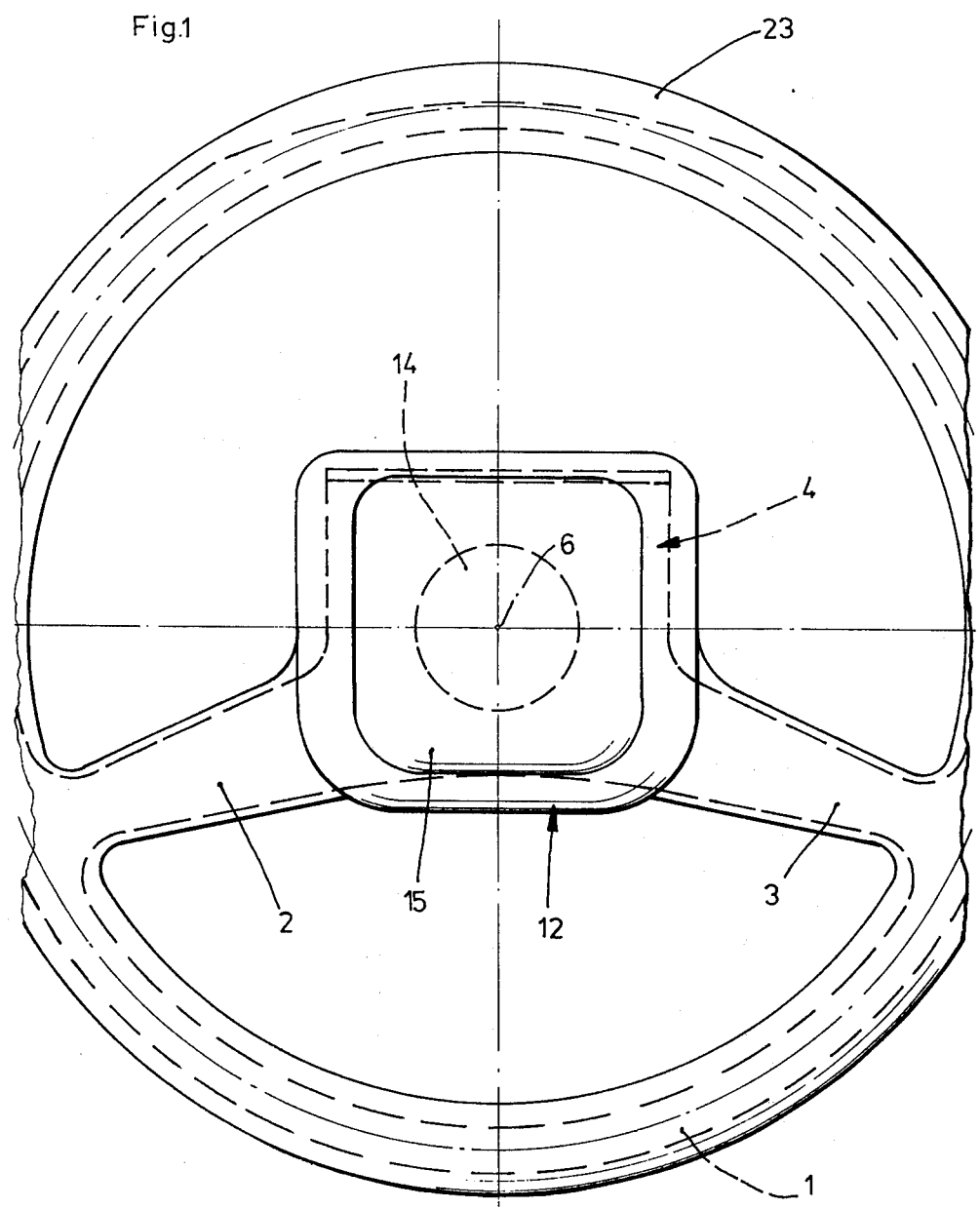
FIG. 1 is a plan view of a steering wheel constructed in accordance with the present invention.
Figure 2:
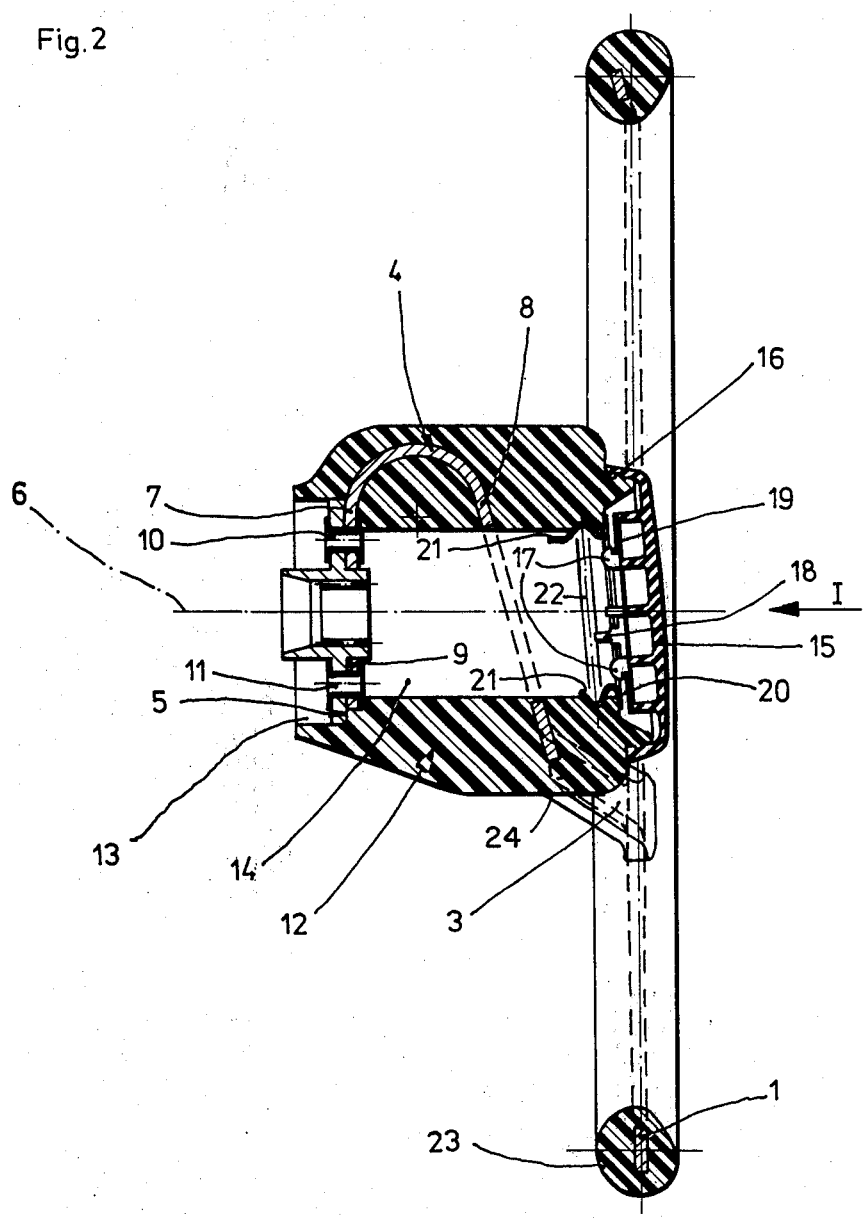
FIG. 2 is a side sectional view of the steering wheel of FIG. 1.

FIGS. 1 and 2 of the drawings illustrate a steering wheel having an outer annular rim to be grasped by a driver, a central hub and two spokes joining the rim to the hub. The steering wheel incorporates a metal core fabricated in one piece from sheet metal of 2 to 3 millimeters thickness. The core is stamped and bent to have a configuration that, in plan view, corresponds with the overall configuration of the steering wheel. Specifically, the core includes a portion 1 defining a core for the rim of the steering wheel, portions 2 and 3 defining the two spokes of the steering wheel, and a portion 4 defining a mounting fixture for mounting the steering wheel on the end of a steering column. The rim core 1 is enclosed in a cover 23 fabricated of solid plastic foam, for example.

As shown in FIG. 2, the core 1 of the rim of the steering wheel does not have the rounded or U shaped cross-sectional configuration found in conventional cores for steering wheel rims. On the other hand, the rim core 1 along the portion of its circumference normally adjacent the top of the steering wheel is inclined relative to the plane defined by the annular rim of the steering wheel and also relative to the circumferential portion of the core of the rim normally positioned at the bottom of the steering wheel. Such a bending or tilting of the core 1 of the steering wheel rim helps the rim core conform more closely with the human anatomy and thereby afford better protection for a driver who is thrown against the steering wheel.

The portion 4 of the steering wheel core that provides the mounting fixture has, when viewed in longitudinal cross-section, i.e., in section taken parallel to the longitudinal axis 6 of the steering column, a pair of legs or arms 7 and 8 joined together at one end each by a curved connecting portion. The two legs 7 and 8 are spaced apart in the direction of the longitudinal axis 6 of the steering column and thereby give the mounting portion 4, in cross-section, a U or V shaped configuration. One of the legs 8 continues on to become the spokes 2 and 3 of the steering wheel, while the other leg 7 is connected to an adjacent end of the steering column. The complete steering column is not illustrated in the drawings, but rather only a support member 5 to which the steering wheel is actually connected.

The support 5 has an annular flange extending radially from a tubular central portion of the support and the leg 7 of the mounting portion 4 of the steering wheel core is juxtaposed with a corresponding bearing surface 9 of the flange of the support member. The leg 7 is fastened to the flange of the support 5 by rivets 10 and 11, with the central portion of the support projecting through an opening in the leg 7. In view of the two-legged or two-armed construction of the mounting portion 4 of the steering wheel core, the mounting portion is deformable and safely absorbs or dissipates applied impact energy through such deformation. In the event that an operator of a vehicle was thrown, in a collision, against the illustrated steering wheel, the impact load applied by the operator's body would cause the leg 8 to move toward the leg 7 until the two legs contacted or until the leg 8 met the central portion of the steering wheel support 5. Some additional energy absorbing deformation of the steering wheel core may also occur at the point 24 where the end of the leg 8 of the mounting portion 4 of the core is bent in transition into the spokes 2 and 3.

The mounting portion 4 of the steering wheel core is enclosed within a tubular, open-ended body 12 that is part of the hub of the steering wheel. The leg 8 of the mounting portion 4, which traverses the central space 14 enclosed by the body 12, is formed with an elliptical hole that aligns with the central space. To complement the deformability of the mounting portion 4, the body 12 is preferably formed of a foam material and is, therefore, flexible and deformable. At its end farther from the rim of the steering wheel, or to the left as illustrated in FIG. 2, the tubular body 12 has a recess 13 that receives and covers the end of the steering column and, in particular, the support member 5. Thus, the end of the steering column closes the corresponding end of the tubular body 12. The other end of the tubular body 12, illustrated to the right in FIG. 2, extends as far as the plane of the steering wheel rim and the opening in the body at the end is closed by a cap 15 formed of a soft material, such as rubber.

As can be seen in FIG. 1, the cap 15 is approximately square and is secured to the tubular body 12 by clipping or snapping over an axial flange at the end of the tubular body. A raised bead 16 extending radially from the end flange engages a corresponding groove in the inner surface of a depending edge portion of the cap 15. Hook shaped members 17 depend from the underside of the cap 15 into the central space 14 enclosed by the tubular body 12 and mount a metal contact ring 19 for a horn (not shown). Spaced a short distance below the contact ring 19 is a second contact ring 20 mounted on the tubular body 12. The second contact ring 20 is held in place by S-shaped, resilient tangs 21 that depend from the contact ring 20 and engage a groove 22 formed in the inner circumference of the body 12. Electric wires (not shown) connect the contact rings 19 and 20 to the horn and a battery (not shown). The wire connected to the ring 19 is attached at the depending lug 18. When the cap is depressed so that the rings 19 and 20 are in contact, the electric circuit is complete and the horn blows.

Figure 3:
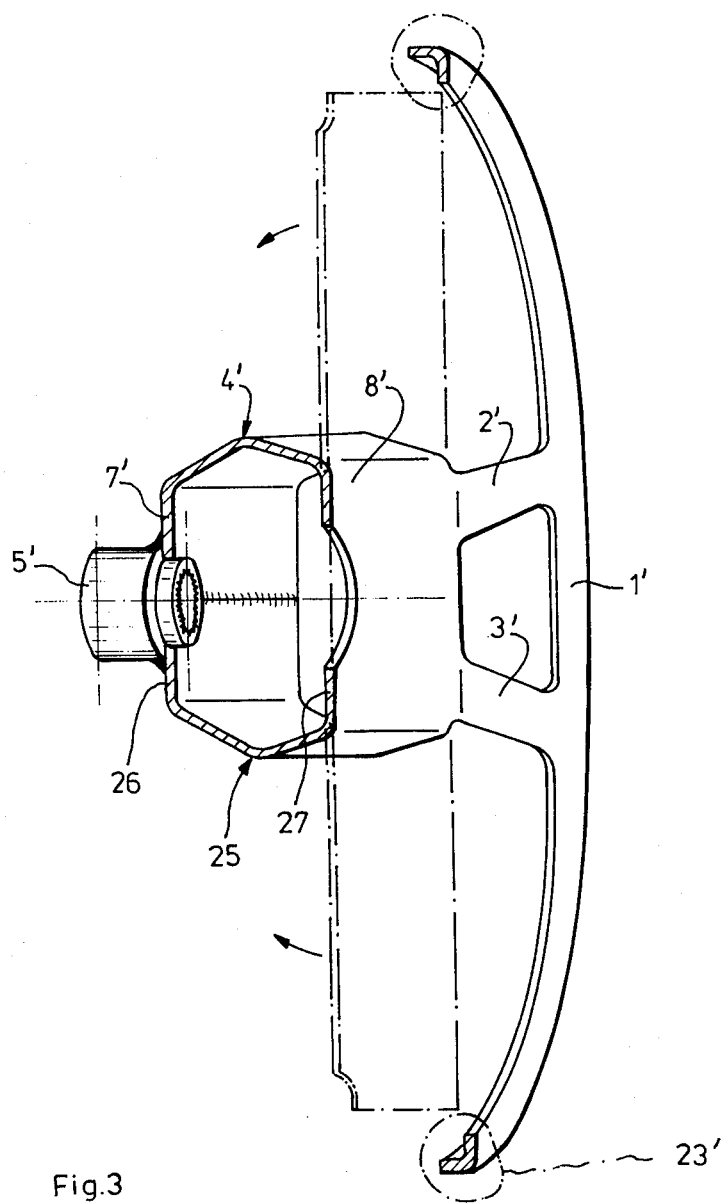
FIG. 3 is a sectional view of a second embodiment of a steering wheel in accordance with the invention.

FIG. 3 of the drawing illustrates a second embodiment of the invention illustrated in FIGS. 1 and 2 and in which like components are designated with like, primed reference numerals. In the embodiment of FIG. 3, the metal core is formed with a second U or V shaped portion 25 having a pair of legs 26 and 27 and a connecting portion joining one end of one leg to one end of the other leg. The complementary U shaped portion 25 opens toward the other U shaped portion 4' and is stamped from the same piece of sheet metal as the remainder of the steering wheel core, as is indicated in phantom in FIG. 3. The facing U shaped portions 4' and 25 of the core give the core a "closed" cross-section and both are attached to the steering column support 5' by welding.

The inventive steering wheels described above can be produced at a relatively low cost and yet offer the advantage of being capable of absorbing considerable impact energy in comparison with known steering wheel constructions. Thus, the inventive steering wheels afford protection for a driver of a vehicle who may be thrown against such a steering wheel. The energy absorbing property is not impaired by the absence of a deeply dished configuration or a padded, protruding hub, for example, since the necessary deformability of the steering wheel is provided by the U shaped mounting portion of the core.

It will be understood that the embodiments described above are merely exemplary and that persons skilled in the art may make many variations and modifications without departing from the spirit and scope of the invention. For example, the tubular body 12 of FIGS. 1 and 2 could be a solid body. All such modifications and variations are intended to be within the scope of the invention as defined in the appended claims.

I claim:

1. A steering wheel for mounting on an end of a steering column comprising:

a. a one-piece integrally-formed member including a rim portion, at least one spoke portion continuing inward from the rim portion, and a mounting portion spaced from a plane defined by the rim portion, the mounting portion having two spaced-apart leg sections and a section connecting together an end of one leg section to a corresponding end of the other leg section so that the mounting portion has a U or V shaped configuration in cross-section, the one leg section continuing at its other end into the at least one spoke portion and the other leg section being adapted to be coupled to the end of the steering column to mount the steering wheel on the steering column, the one leg section defining a hole in the region of its intersection with the axis of the steering column, the mounting portion being deformable such that at least one of the spaced-apart leg sections moves toward the other leg section to absorb impact energy when a load exceeding a predetermined load is exerted on the mounting portion, and b. a deformable hollow tubular body which has the mounting portion of the integrally-formed member embedded within it so as to increase the energy absorption capability of the mounting portion and which body extends away from the plane of the rim portion, the tubular body being adapted to be closed at an end thereof closer to the plane of the rim portion and provided at another end opposite the closed end with a recess for receiving the end of the steering column such that the steering column can be coupled to the mounting portion of the integrally-formed member, the hole in the one leg section being at least partially coextensive with a central space defined by the hollow tubular body.

2. The steering wheel defined in claim 1, wherein the end of the steering column includes a portion having at least one flange extending radially outwardly of the steering column, the other leg section of the mounting portion of the metal member being adapted to be juxtaposed with and secured to said at least one flange.

3. The steering wheel defined in claim 1, wherein the integrally-formed member is fabricated in one piece from sheet metal.

4. The steering wheel defined in claim 1, wherein the hollow tubular body is fabricated of foamed plastic.

5. In steering apparatus that includes a steering column and a steering wheel having an annular rim, a central hub and at least one spoke joining the rim to the hub, the improvement comprising a metal member that includes (a) a rim portion defining a core for the annular rim of the steering wheel, (b) at least one spoke portion defining at least a core for the spoke of the steering wheel, and (c) a mounting portion located on the metal member so as to be within the hub of the steering wheel, the mounting portion of the metal member having two spaced-apart leg sections and a section connecting together an end of one leg section to a corresponding end of the other leg section so that the mounting portion has a U or V shaped configuration in cross-section, the one leg section continuing at its other end into the spoke portion of the metal member and the other leg section being adapted to be coupled to an end of the steering column to mount the steering wheel on the steering column, the mounting portion of the metal member being deformable such that at least one of the spaced-apart leg sections moves toward the other leg section to absorb impact energy when a load exceeding a predetermined load is exerted on the mounting portion, wherein the metal member also includes a portion complementing the mounting portion and having two leg sections and a section connecting corresponding ends of said leg sections of the complementing portion so that the complementing portion has a U or V shaped configuration in cross-section, one of the leg sections of the complementing portion continuing into the spoke portion of the metal member and the mounting and complementing portions being disposed opposite each other so that their U or V shaped cross-sections open toward each other.

* * * * *